(No Model.) 2 Sheets—Sheet 1.
G. PELSTRING.
MACHINE FOR GRAINING WOOD.
No. 523,235. Patented July 17, 1894.
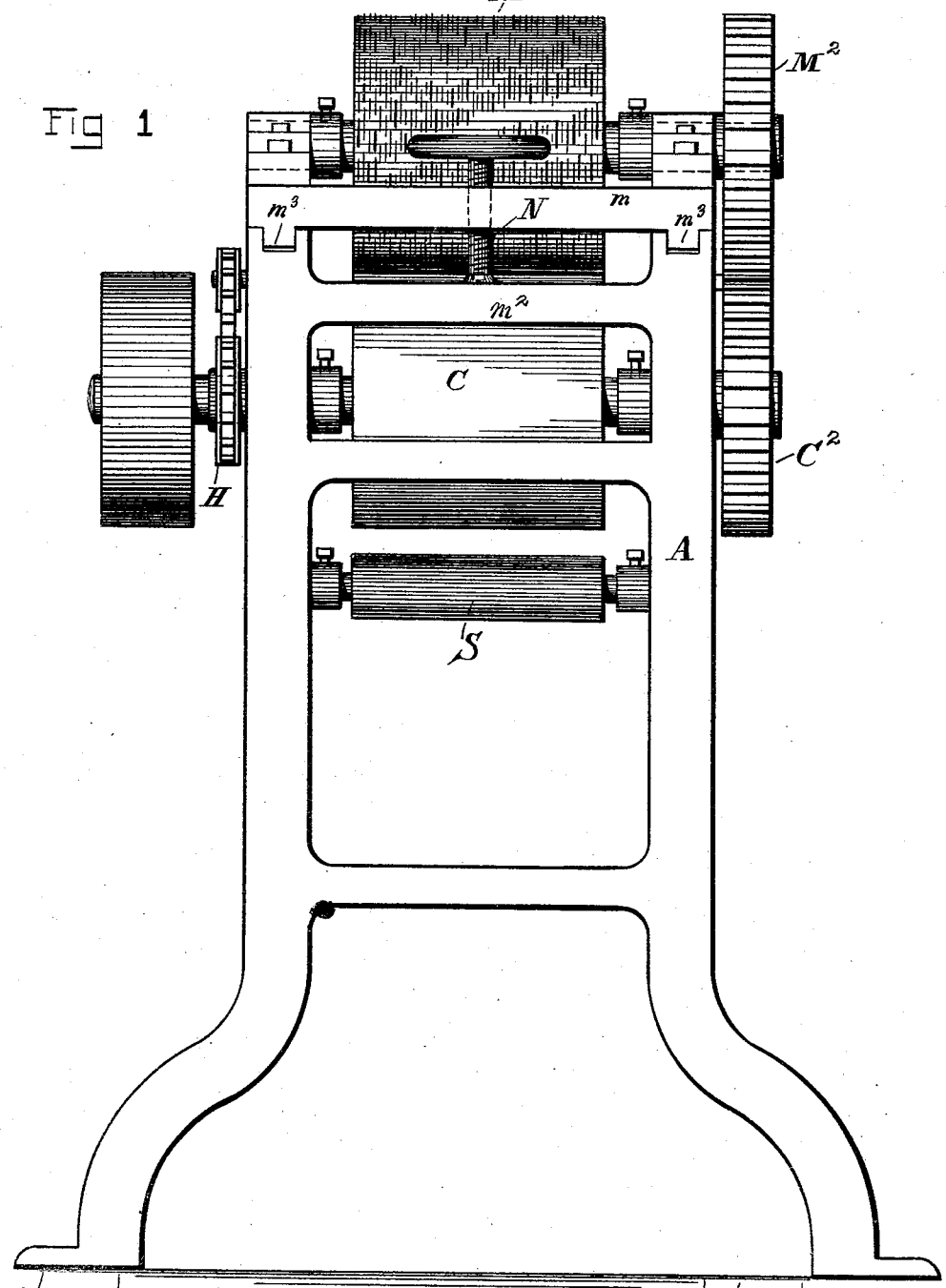

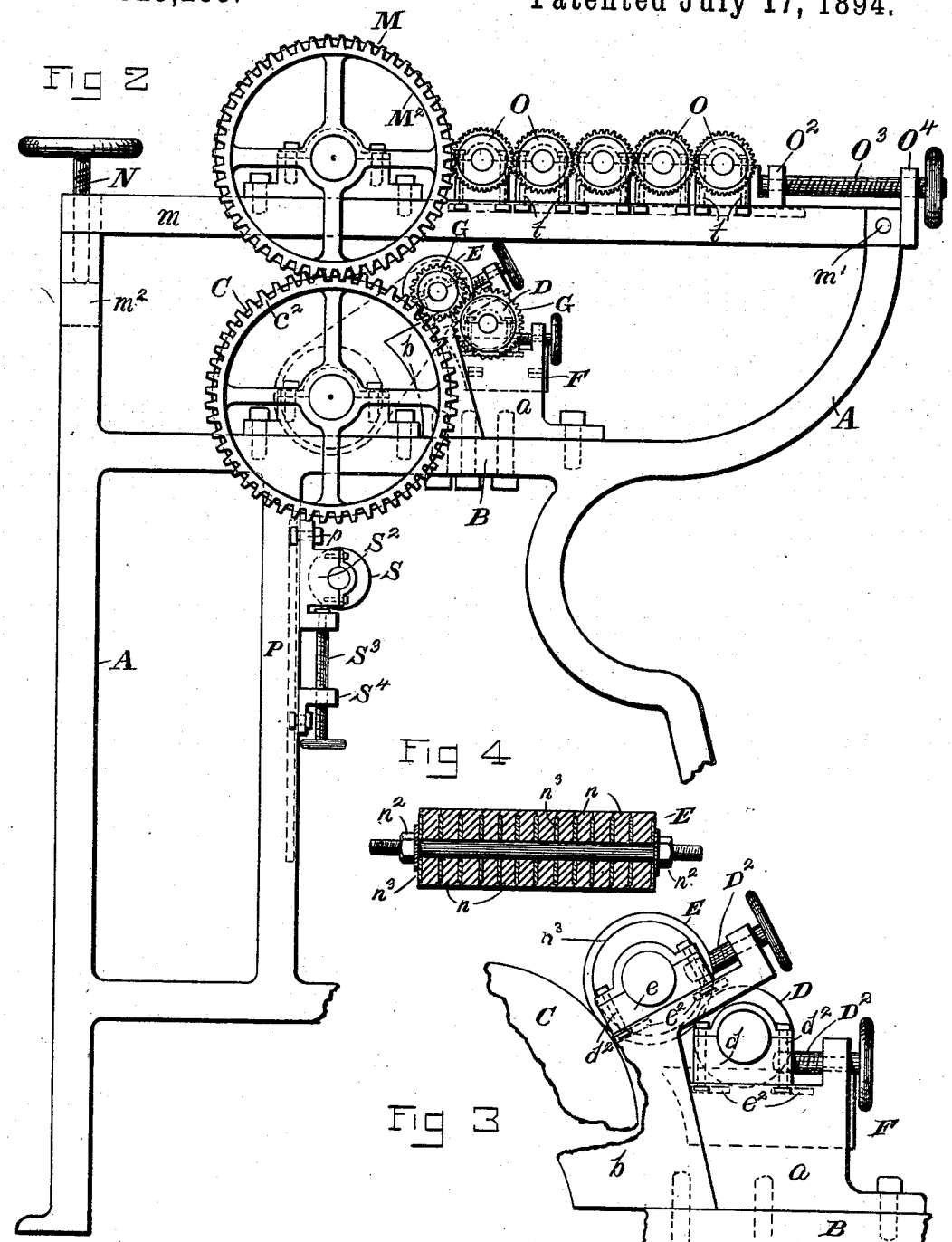

UNITED STATES PATENT OFFICE.

GEORGE PELSTRING, OF CINCINNATI, OHIO.

MACHINE FOR GRAINING WOOD.

SPECIFICATION forming part of Letters Patent No. 523,235, dated July 17, 1894.

Application filed July 8, 1893. Serial No. 479,964. (No model.)

*To all whom it may concern:*

Be it known that I, GEORGE PELSTRING, a citizen of the United States, residing at Cincinnati, Hamilton county, State of Ohio, have invented certain new and useful Improvements in Machines for Graining Wood, of which the following is a specification, reference being had to the accompanying drawings.

My invention relates to that class of machines for graining wood which have a rotatable cylinder, the outer surface of which is provided with grain-type of such size and so proportioned as to simulate any predetermined kind of wood, said invention consisting in the mechanism and means hereinafter set forth for transposing the imprint of said cylinder upon a plain board, of a cheap quality or grade.

In the accompanying drawings: Figure 1, is a front elevation of a machine embodying my invention and as preferably constructed, and Fig. 2, is a side elevation of same, a portion of the supporting frame being broken away. Fig. 3, is an enlarged side elevation of the frames upon which the cleaning-rollers are mounted, the gears for operating said rollers being removed. Fig. 4 is a longitudinal section through one of the cleaning-rollers, showing the preferred construction of same.

In the accompanying drawings, A, represents the supporting frame of the machine, and B represents the transverse side frames upon which the composition roller, C, is mounted. These side frames also afford a support for the vertical frame pieces, $a$, $b$, upon which the cleaning-rollers D and E are mounted. The frames $b$ (one on each side) extend upward somewhat above the frames $a$,—the former serving as a support for roller E while the latter serve as a support for roller D. The journal bearings $e$ and $d$ of the rollers D and E are made adjustable upon the side frames $a$ and $b$ by means of bolts $d^2$, the heads of which are adapted to engage and slide within the T-shaped recesses $e^2$ in the top face of said frames, as shown by dotted lines in Fig. 3. Having adjusted the cleaning rollers to their proper position relative to each other and the composition roller, C, they are secured in said adjusted position by tightening the nuts on bolts $d^2$.

Between the two side frames, $a$, is a pan, F, which may be detachably connected thereto in any desired manner, for the purposes hereinafter set forth.

The cleaning roller, E, is formed of suitable absorbent material attached upon and around the shaft, said material preferably consisting of pieces of sponge, $n$, which are forced over and around the shaft and secured thereon by nuts $n^2$, or other suitable means, said pieces of sponge being preferably separated and compacted by washers, $n^3$, of a diameter less than that of the absorbent material.

The roller D may be formed of wood, metal or other suitable material, said roller being adapted to impinge against the pliable absorbent roller, E, for the purposes hereinafter set forth.

The cleaning rollers are connected by means of the gears, G,—the opposite end of the shaft of roller E having a chain connection with the sprocket-wheel, H, mounted on the main driving shaft, as shown in Fig. 1, and by dotted lines in Fig. 2.

M, represents the grain-type cylinder, having projections thereon corresponding to the outline configuration of the grain of the wood to be simulated. This cylinder may be engraved, or it may be provided with an electro-type cast plate as set forth in my application for Letters Patent, Serial No. 479,425, for the process therein set forth. This cylinder is so mounted as to admit of its being adjusted with reference to the composition roller, C, one mode of thus adjustably mounting said cylinder being shown, which consists of the the top frame, $m$, hinged at $m'$ to the rear frame, A, said cylinder being journaled upon said hinged frame, as shown. The front transverse portion of said hinged frame is provided with a screw-threaded opening, within which the hand-screw, N, operates,—the lower end of said screw resting upon the cross-frame, $m^2$, as shown.

To prevent lateral movement of the hinged frame, $m$, the latter is provided on its front portion with lugs, $m^3$, which engage within correspondingly shaped recesses on the top of the main frame, as shown in Fig. 1.

Upon the top hinged frame, at the rear of the type-cylinder, is mounted the ink-rollers, O, which latter have bearings adjustably connected to said frame by means of bolts, $t$, the heads of which engage within a T-slot in the top of each side frame, as shown by dotted line in Fig. 2. To increase or diminish the pressure of said ink-rolls relative to the type-cylinder, I have provided a cross-strip $O^2$ having a hand-screw $O^3$ attached thereto, said screw operating within a screw-threaded opening in cross-piece $O^4$, as shown. The strip $O^2$ impinges against the bearings of the rear ink-roll; and, to adjust the ink-rolls, all that is required is to loosen the nuts on bolts, $t$, and operate the hand-screw in the proper direction to attain the desired pressure, at which time said nuts are again tightened.

The type-cylinder, M, and the composition roll, C, are rotatably connected, preferably by means of gears, $M^2$ and $C^2$, as shown, the latter being keyed to the main stationary driving shaft.

The impression-roller, S, is mounted on bearings $S^2$, the latter being adjustably connected to the side frames, P; and, when connected as shown, the heads of bolts $p$ engage within T-shaped grooves in said frames, as shown by dotted lines in Fig. 2. To the lower portion of each bearing $S^2$ is rotatably connected the screw, $S^3$, which operates within a bracket $S^4$ adjustably connected to the frame P, as shown. To raise or lower said feed-roll, the operator loosens the nuts on bolts $p$, and turns the screws $S^3$ in the proper direction; and, after the desired adjustment is attained, said nuts are again tightened. The object of having the impression roller made vertically adjustable is to accommodate varying thicknesses of board or other material to be grained.

The operation of my improved graining machine is as follows: The graining material or ink is fed to the type cylinder M, by means of the ink-rolls, O; and, the ink thus deposited upon the grain-type is carried around and deposited upon the surface of the composition roll, C, which latter, as it comes into contact with the surface of the board to be grained, deposits thereon the printing material, which latter in outline is a fac-simile of the outline of the grain-type on said cylinder. The strip of wood to be grained is fed upon the roll S beneath the composition roll, said impression roller being first adjusted, as aforedescribed, to accommodate the thickness of the strip to be grained. Any surplus printing material that may be left upon the composition roll, (after having passed over the grained strip) is wiped off by means of the absorbent roll E, which latter is compressed by roll D. This roller D is so journaled as that its lower face will rest within the pan F, (see dotted lines in Fig. 3) which latter is filled, preferably, with benzine; and, as said roller revolves, it will carry with it a small quantity of the benzine which is taken up by the absorbent roller E, in its rotation. The roller E, being saturated with the benzine will keep the composition roller perfectly clean, which is quite desirable to insure a perfect print with each rotation thereof; and, after having wiped off the surplus ink, the latter is compressed or squeezed out of the absorbent roll and drips down into the pan,—the printing material settling to the bottom thereof.

The advantages of my improved graining machine are many and obvious. The composition roller, upon which the outline imprint of the grain is deposited, will yield and accommodate itself to strips of wood having an uneven surface, the graining of which has, heretofore, been a laborious and expensive operation.

The type-cylinder and feed-roll are both made adjustable with reference to the composition roll, by reason of which I am enabled to attain the best possible imprint.

The absorbent cleaning roll, E, in connection with its compression roll, D, affords an efficient automatic device for keeping the composition roll perfectly clean, said rollers D and E being made adjustable through the medium of screws $D^2$ operating within the bearings of said rolls, as shown.

While it is preferred to embody the various details of construction herein shown and described, in the construction of my improved machine, one or more of said details may be altered or dispensed with without departing from the essential features of my invention.

What I claim as new, and desire to secure by Letters Patent, is—

1. In a graining machine, the combination of type-cylinder M, composition roller C and impression-roller S, said type-cylinder and impression-roller being capable of adjustment toward or away from said composition roller, and suitable operative mechanism for rotating said roller and cylinder and for feeding printing material to the latter, substantially as set forth.

2. In a graining machine, the combination of composition roller C, impression-roller S and grain-type cylinder M, the latter being rotatably mounted upon a hinged frame, and suitable means for adjusting said frame and for feeding the printing material to said cylinder, substantially as set forth.

3. In a graining machine, the combination of composition roller C, impression-roller S and type cylinder M, the latter being rotatably mounted upon a hinged frame, ink-rollers O mounted upon said frame, the latter having an adjustment screw N, and means for rotating said cylinder and composition roller, as set forth.

4. In a graining machine provided with a type cylinder and a composition roller, substantially as set forth, the absorption roller E and compression roller D, said absorption roller being adapted to rotate and impinge against the surface of said composition roller, and suitable means for rotating said rollers and cylinder and for feeding printing material to the latter, as set forth.

5. In a graining machine having a type cylinder and a composition roller as set forth, the cleaning roller E, the latter consisting of absorbent material arranged around and compressed upon the shaft thereof, and a suitable compression roll as and for the purposes specified.

6. In a graining machine, the combination of type-cylinder M, composition roller C, impression roller S, and cleaning rollers D and E, said cleaning rollers being mounted in an adjustable position relative to each other and relative to said composition roller, and suitable means for rotating said rollers and cylinder and for feeding the printing material to the latter, as set forth.

GEORGE PELSTRING.

Witnesses:
O. M. HILL,
CHARLES J. RUFFIN.